US012216362B2

(12) United States Patent
Li et al.

(10) Patent No.: US 12,216,362 B2
(45) Date of Patent: Feb. 4, 2025

(54) DISPLAY PANEL AND DISPLAY DEVICE

(71) Applicant: HKC CORPORATION LIMITED, Shenzhen (CN)

(72) Inventors: Junlian Li, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 139 days.

(21) Appl. No.: 17/945,081

(22) Filed: Sep. 14, 2022

(65) Prior Publication Data

US 2023/0080074 A1 Mar. 16, 2023

(30) Foreign Application Priority Data

Sep. 15, 2021 (CN) .......................... 202111077898.9

(51) Int. Cl.
G02F 1/1339 (2006.01)
G02F 1/1335 (2006.01)

(52) U.S. Cl.
CPC .... *G02F 1/13394* (2013.01); *G02F 1/133512* (2013.01); *G02F 2201/501* (2013.01)

(58) Field of Classification Search
CPC ............... G02F 1/1339; G02F 1/13392; G02F 1/13394; G02F 1/13396; G02F 1/13398
See application file for complete search history.

(56) References Cited

U.S. PATENT DOCUMENTS

2018/0107051 A1* 4/2018 Hu ..................... G02F 1/133512
2018/0129108 A1* 5/2018 Lee ..................... G02F 1/136209

FOREIGN PATENT DOCUMENTS

CN 106802517 A 6/2017

OTHER PUBLICATIONS

English language translation of Chinese Patent Publication No. CN101149545. Document downloaded from Espacenet at worldwide.espacenet.com on Jul. 10, 2024; translation provided by Google Translate tool on-site. (Year: 2008).*

* cited by examiner

Primary Examiner — Angela M. Medich

(57) ABSTRACT

A display panel and a display device are disclosed. The display panel includes a first substrate, a second substrate and a spacer. The first substrate and the second substrate are aligned and bonded together. The spacer is arranged between the first substrate and the second substrate. The second substrate includes multiple pixel regions arranged in an array and a shielding region located between adjacent pixel regions. One end of the spacer is fixed to the first substrate, and the other end abuts on the respective shielding region. The second substrate further includes an anti-skid structure arranged in the shielding region and disposed between the respective adjacent pixel regions. Both ends of the anti-skid structure extend along the shielding region to form a guide member.

9 Claims, 8 Drawing Sheets

DISPLAY PANEL AND DISPLAY DEVICE

CROSS-REFERENCE TO RELATED APPLICATIONS

This application claims the priority and benefit of Chinese patent application CN202111077898.9, entitled "Display Panel and Display Device" and filed Sep. 15, 2021 with China National Intellectual Property Administration, the entire contents of which are incorporated herein by reference.

TECHNICAL FIELD

This application relates to the field of display technology, and more particularly relates to a display panel and a display device.

BACKGROUND

The statements herein are intended for the mere purpose of providing background information related to the present application and do not necessarily constitute prior art.

With the progress of society and the improvement of people's living standards, high resolution, high transmittance, superior picture quality, superior pressure resistance and low cost make liquid crystal display panels more and more popular.

In order to control the uniformity of the thickness of the liquid crystal cell and make the liquid crystal display panel have superior pressure resistance when it is pressed, spacers are usually arranged between the two substrates of the liquid crystal display panel. However, when the liquid crystal display panel is transported and when the liquid crystal display panel is subjected to a pressure test, the spacers will be displaced and scratch the alignment film layer located in the effective display area, resulting in incorrect alignment of the liquid crystal molecules, thus affecting the display effect of the display panel. Usually, additional limiting structures are arranged on the array substrate to prevent the spacers from moving, which however often affects the aperture ratio of the display panel.

Therefore, how to prevent the spacers from scratching the alignment film when the spacers are displaced, which affects the display effect of the display panel, is particularly important.

SUMMARY

It is therefore a purpose of the present application to provide a display panel and a display device, where when the spacer slides, the spacer is guided to avoid the pixel region, and the alignment film of the pixel region is effectively prevented from being scratched by the spacer.

The present application discloses a display panel including a first substrate, a second substrate and a spacer. The first substrate and the second substrate are aligned and bonded together to form a cell. The spacer is arranged between the first substrate and the second substrate. The second substrate includes a plurality of pixel regions arranged in an array and a shielding region disposed between adjacent pixel regions. One end of the spacer is fixed to the first substrate, and the other end of the spacer abuts on the respective shielding region. The second substrate further includes an anti-skid structure, which is arranged in the shielding region and located between the respective adjacent pixel regions. Both ends of the anti-skid structure extend along the shielding region to form a guide member.

Optionally, the spacer is disposed between two adjacent pixel regions. The anti-skid structure includes a first anti-skid portion and a second anti-skid portion, and where the first anti-skid portion and the second anti-skid portion are each arranged on a respective side of the spacer adjacent to the respective one of the two adjacent pixel regions. Both ends of each of the first anti-skid portion and the second anti-skid portion extend along the shielding region to form the guide member.

Optionally, the first anti-skid portion includes a plurality of first protrusions, and the second anti-skid portion includes a plurality of second protrusions. The plurality of first protrusions and the plurality of second protrusions are both formed by protruding from the second substrate toward the first substrate. The plurality of first protrusions are continuously arranged to form the first anti-skid portion, and the plurality of second protrusions are continuously arranged to form the second anti-skid portion. The first protrusions and the second protrusions are each continuously arranged to form an arc shape or a bending-line shape. The heights of the plurality of first protrusions gradually decrease in the direction from being close to the spacer to being far away from the spacer. The heights of the plurality of second protrusions gradually decrease in the direction from being close to the spacer to being far away from the spacer.

Optionally, the plurality of the first protrusions are arranged in sequence to form a multiple rows of first blocking walls, which are arranged at intervals between the spacer and the respective pixel region, and the heights of the plurality of first blocking walls gradually increase in the direction from the spacer to the respective pixel region. The plurality of second protrusions are arranged in sequence to form multiple rows of second blocking walls, which are arranged between the spacer and the pixel region at intervals, and the heights of the plurality of second blocking walls gradually increase in the direction from the spacers to the respective pixel region.

Optionally, the first anti-skid portion includes a first raised strip; the second anti-skid portion includes a second raised strip. The first raised strip and the second raised strip are both elongated protrusions formed by the second substrate protruding toward the first substrate. The first raised strip and the second raised strip are arc-shaped or bending-line-shaped.

Optionally, the first anti-skid portion includes a first groove, and the second anti-skid portion includes a second groove. Both the first groove and the second groove are concavely formed in the second substrate which sinks in the direction away from the first substrate. The extension direction of the first groove and the second groove are arc-shaped or bending-line-shaped. The first groove includes a first groove bottom, the first groove bottom is inclined relative to the second substrate, and the inclination of the first groove bottom gradually decreases in the direction from being close to the spacer to being far away from the spacer. The second groove includes a second groove bottom, the second groove bottom is inclined relative to the second substrate, and the inclination of the second groove bottom gradually decreases in the direction from being close to the spacer to being far away from the spacer. Furthermore, the width of the first groove and the width of the second groove are each greater than the width of one end of the spacer abutting on the second substrate.

Optionally, the anti-skid structure includes a third anti-skid portion, a fourth anti-skid portion, a fifth anti-skid portion, and a sixth anti-skid portion. The guide member includes a first guide portion. One end of the spacer is fixedly connected with the first substrate, and the other end abuts against the portion between the four adjacent pixel regions. The third anti-skid portion, the fourth anti-skid portion, the fifth anti-skid portion, and the sixth anti-skid portion are each arranged between the spacer and the respective one of the four adjacent pixel regions. Both ends of each of the third anti-skid portion, the fourth anti-skid portion, the fifth anti-skid portion, and the sixth anti-skid portion extend along the direction of the shielding region to form the first guide portion. The third anti-skid portion, the fourth anti-skid portion, the fifth anti-skid portion and the sixth anti-skid portion are centrally symmetrically arranged with the spacer as the center.

Optionally, the first substrate is a color filter substrate, the second substrate is an array substrate, and where the array substrate is arranged on the side adjacent to the light incident surface of the display panel. The array substrate includes a plurality of horizontally arranged scan lines, a plurality of vertically arranged data lines, and a passivation layer. The plurality of the scan lines and the plurality of the data lines vertically cross over each other to define the plurality of pixel regions. The passivation layer covers the plurality of scan lines and the plurality of data lines to form the shielding region. The anti-skid structure is formed by the passivation layer, and is correspondingly arranged on the respective data line or scan line. The spacer abuts against the shielding region between at least two adjacent pixel regions. Both ends of the anti-skid structure extend along the direction of the respective data line or scan line.

Optionally, the first substrate is an array substrate, the second substrate is a color filter substrate, and where the color filter substrate is arranged on the side adjacent to the light incident surface of the display panel. The color filter substrate includes a plurality of horizontal black matrices arranged in parallel with each other, and a plurality of vertical black matrices perpendicularly intersecting the horizontal black matrices, where the plurality of the horizontal black matrices and the plurality of the vertical black matrices form the shielding region and intersect each other to define the plurality of first pixel regions that are arranged in an array. Each horizontal black matrix corresponds to the position of the respective scan line of the array substrate. Each vertical black matrix corresponds to the position of the respective data line of the array substrate. One end of the spacer is fixed to the array substrate, and the other end abuts on the respective horizontal black matrix or the vertical black matrix. The anti-skid structure is arranged on the respective horizontal black matrix or the vertical black matrix. Both ends of the anti-skid structure extend along the direction of the respective horizontal black matrix or vertical black matrix.

The present application further discloses a display device, including a backlight module and the above-mentioned display panel, wherein the backlight module is arranged on the side of the light incident surface of the display panel.

Compared with the solution of additionally disposing a limit structure on the substrate to prevent the spacer from moving, the present application does not limit the spacer, but provides an anti-skid structure on the second substrate on the side of the spacer adjacent to the pixel region, and the extension direction of the anti-skid structure does not intersect the pixel region, so that when the spacer is moved under pressure towards the pixel region, it will first be blocked by the anti-skid structure when it moves to the anti-skid structure, preventing the spacer from sliding, towards the pixel region. Furthermore, during the further movement of the spacer, it will move along the extension direction of the anti-skid structure, and the anti-skid structure guides the spacer to move away from the pixel region, which effectively prevents the spacer from scratching the alignment film in the pixel region, thus ensuring the display effect of the display panel.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Obviously, the drawings used in the following description merely depict some embodiments of the present application, and for those having ordinary skill in the art, other drawings can also be obtained from these drawings without investing creative effort. In the drawings.

DETAILED DESCRIPTION OF EMBODIMENTS

Figure 1:
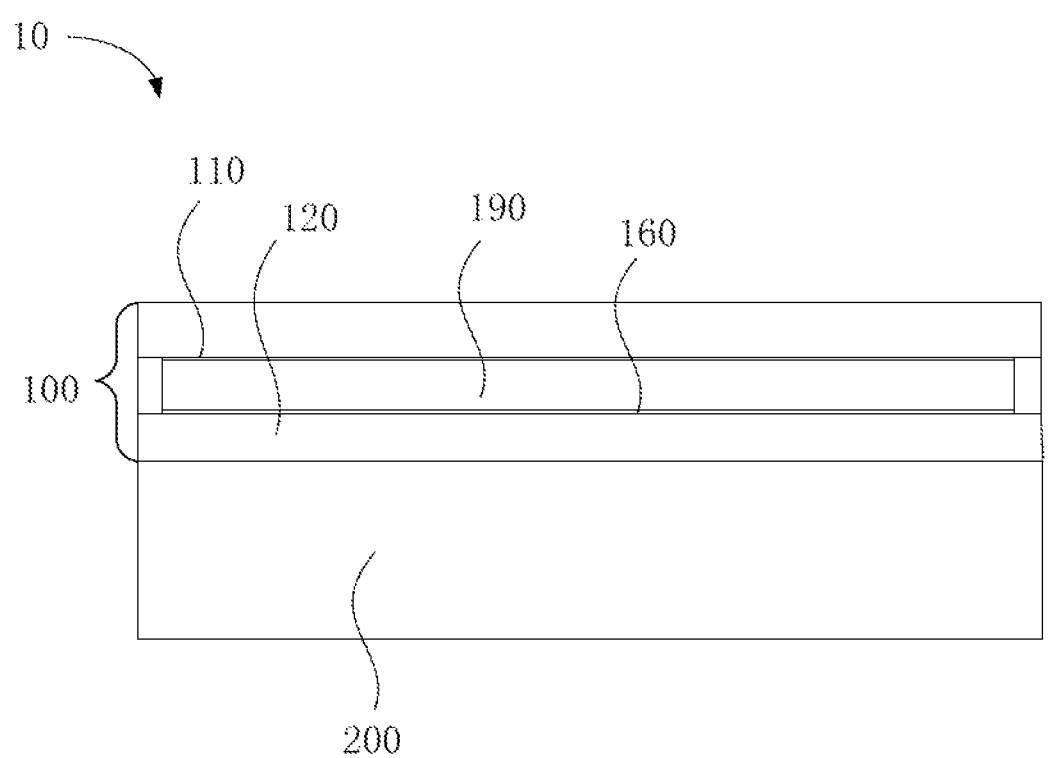
FIG. 1 is a schematic diagram of an embodiment of a display device according to the present application.

It should be understood that the terminology used herein, the specific structural and functional details disclosed are intended for the mere purpose of describing specific embodiments and are representative, but the present application may be embodied in many alternative forms and should not be construed as limited only the embodiments set forth herein.

In the description of this application, the terms "first" and "second" are merely used for description purposes, and cannot be understood as indicating relative importance, or implicitly indicating the number of indicated technical features. Thus, unless otherwise specified, features defined as "first" and "second" may expressly or implicitly include one or more of the features; "plurality" means two or more. The terms "including", "comprising", and any variations thereof are intended to mean a non-exclusive inclusion, namely one or more other features, integers, steps, operations, units, components and/or combinations thereof may be present or added.

In addition, terms such as "center", "transverse", "lateral", "above", "on", "under", "below", "left", "right", "vertical", "horizontal", "top", "bottom", "inside", "outside", etc., indicative of orientations or positional relationships are described based on the orientations or relative positional relationships illustrated in the drawings, and are intended for the mere purpose of convenience of simplified description of the present application, rather than indicating that the device or element referred to must have a specific orientation or be constructed, and operate in a particular orientation. Thus, these terms should not be construed as limiting the present application.

In addition, unless otherwise expressly specified and defined, terms "installed on", "connected to", and "coupled to" should be understood in a broad sense. For example, it may be a fixed connection, a detachable connection, or an integral connection; it may be a mechanical connection, or may also be an electrical connection; it may be a direct connection, an indirect connection through an intermediate medium, or an internal connection between two components. For those having ordinary skill in the art, the specific meanings of the above terms in this application can be understood depending on specific contexts.

The present application will be described in detail below with reference to the accompanying drawings and optional embodiments.

FIG. 1 is a schematic diagram of an embodiment of a display device according to the present application. As illustrated in FIG. 1, the present application discloses a display device 10, which includes a backlight module 200 and a display panel 100, where the backlight module 200 is disposed on the side of a light incident surface of the display panel 100.

Generally, the display panel 100 itself does not emit light, and a backlight module 200 is required to provide a light source for the display panel 100 so that the display panel 100 can display normally. A liquid crystal layer 190 is placed between the upper and lower substrates of the display panel 100, and the liquid crystal molecules are controlled to change orientation by applying a driving voltage on the two glass substrates, and the light from the backlight module 200 is deflected to produce a picture. In the cell-forming process of the display panel 100, a layer of alignment film 160 is usually produced on each of two substrates first, where the material of the alignment film 160 is usually a polyimide material, and then the sealant is applied and the liquid crystal is dropped. In order to effectively support the two layers of substrates after the two substrates are assembled, a spacer 150 will be placed between the two substrates, and then the two substrates will be bonded together in a vacuum state, and finally the two substrates will be irradiated by ultraviolet rays to cure the sealant, thus achieving the cell packaging.

The display device 10 of the present application may be any product or component with a display function, such as a liquid crystal TV a liquid crystal display, a digital photo frame, a mobile phone, a tablet computer, etc., without specific limitation, and the present application only uses the liquid crystal display device 10 as an example for illustration.

When the display device 10 of the present application is squeezed by an external force or subjected to a pressure test, the spacer 150 is bent and displaced under the action of pressure, which can guide the spacer 150 to move away from the effective display area, effectively preventing the spacer 150 from scratching the alignment film 160 in the effective display area, and ensuring the yield and service life of the display device 10.

The present application specifically improves the display panel 100 in the display device 10.

Figure 2:
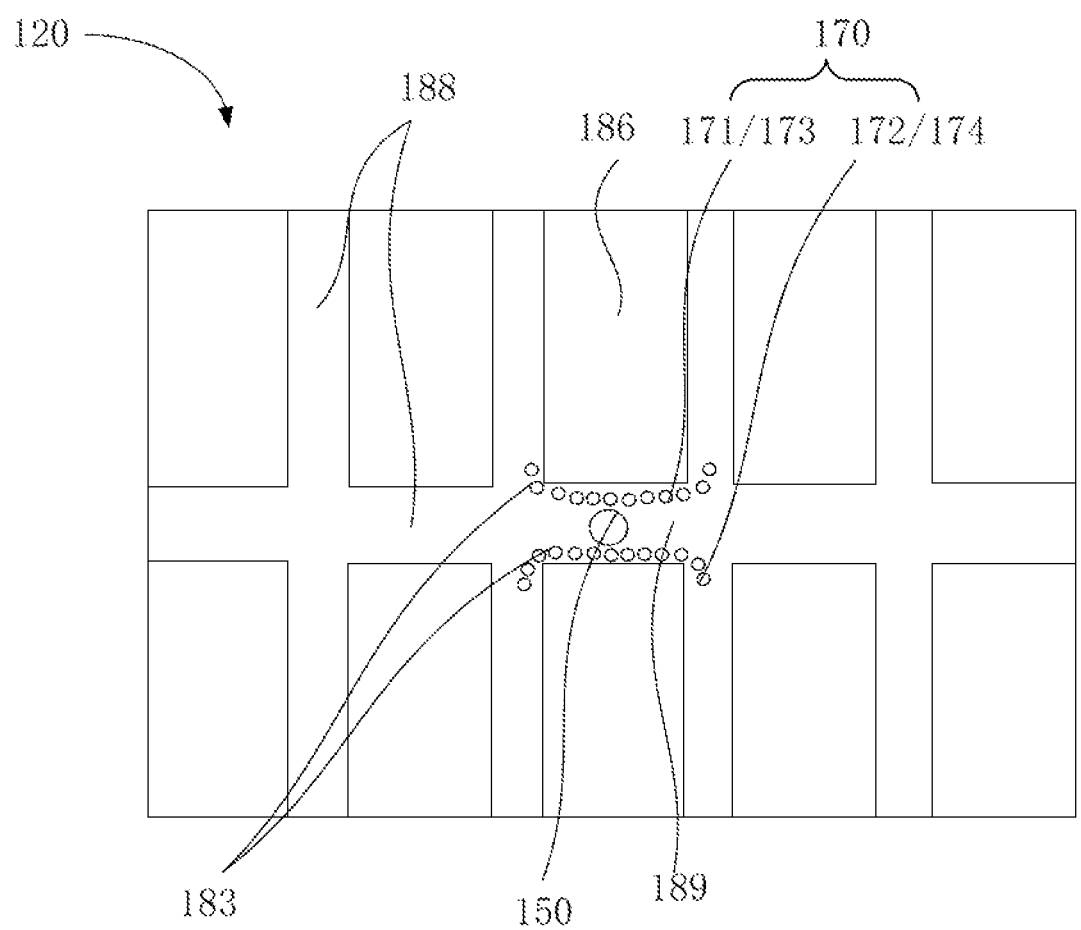
FIG. 2 is a top view of a second substrate of a first embodiment of a display panel according, to the present application.

FIG. 2 is a schematic diagram of a first embodiment of a display panel according to the present application. As illustrated in FIG. 2, the present application discloses a display panel 100, including a first substrate 110, a second substrate 120 and a spacer 150. The first substrate 110 and the second substrate 120 are aligned and bonded together. The spacer 150 is disposed between the first substrate 110 and the second substrate 120. The second substrate 120 includes a plurality of pixel regions 186 arranged in an array and a shielding region 188 between adjacent pixel regions 186. One end of the spacer 150 is fixed to the first substrate 110, and the other end abuts against the shielding region 188. The second substrate 120 further includes an anti-skid structure 170, and the anti-skid structure 170 is disposed in the shielding region 188 and located between the pixel region 186 and the spacer 150. Both ends of the anti-skid structure 170 extend along the shielding region 188 to form a guide member 183.

The present application does not limit the spacer 150, but provides an anti-skid structure 170 on the side of the spacer 150 on the second substrate 120 adjacent to the pixel region 186, and the extension direction of the anti-skid structure 170 does not intersect the pixel region 186, so that when the spacer 150 is moved under pressure towards the pixel region 186, it will first be blocked by the anti-skid structure 170 when it moves to the anti-skid structure 170, preventing the spacer 150 from sliding towards the pixel region 186. Furthermore, during the further movement of the spacer 150, it will move along the extension direction of the anti-skid structure 170, and the anti-skid structure 170 guides the spacer 150 to move away from the pixel region 186 which effectively prevents the spacer 150 from scratching the alignment film 160 in the pixel region 186, thus ensuring the display effect of the display panel 100.

As illustrated in FIG. 2, when there are at least two adjacent pixel regions 186 around the spacer 150, the spacer 150 is located between the two adjacent pixel regions 186. The anti-skid structure 170 includes a first anti-skid portion 171 and a second anti-skid portion 172. The first anti-skid portion 171 and the second anti-skid portion 172 are respectively disposed on sides of the spacer 150 adjacent to the two adjacent pixel regions 186, corresponding to the shielding region 188. Both ends of each of the first anti-skid portion 171 and the second anti-skid portion 172 extend along the shielding region 188 to form the guide member 183. The area sandwiched between the first anti-skid portion 171 and the second anti-skid portion 172 is a guide region 189, where the guide region 189 is disposed corresponding to the shielding region 188.

By arranging the anti-skid structure 170 composed of the first anti-skid portion 171 and the second anti-skid portion 172 on both sides of the spacer 150 standing between two adjacent pixel regions 186 adjacent to the pixel region 186, and arranging the guide region 189 formed between the first anti-skid portion 171 and the second anti-skid portion 172, where the guide region 189 is disposed corresponding to the shielding region 188, the extending directions of the first anti-skid portion 171 and the second anti-skid portion 172 do not intersect the pixel region 186. Thus, when the spacer 150 is moved under pressure, if it moves toward the pixel region 186, when the spacer 150 moves to the first anti-skid portion 171 or the second anti-skid portion 172, it will first be blocked by the first anti-skid portion 171 or the second anti-skid portion 172, preventing the spacer 150 from sliding toward the pixel region 186. Meanwhile, the spacer 150 will move along the extending direction of the first anti-skid portion 171 or the second anti-skid portion 172 during the further movement, and the anti-skid structure 170 is used to guide the spacer 150 to move away from the pixel region 186, which effectively prevents the spacer 150 from scratching the alignment film 160 of the pixel region 186 and ensures the display effect of the display panel 100.

When the spacer 150 is located close to the edge of the display panel 100, the pixel region 186 may exist only on one side of the spacer 150, so only the first anti-skid portion 171 may be provided between the spacer 150 and the pixel region 186 to achieve the above-mentioned effects, which will not be repeated here.

As illustrated in FIG. 2, the first anti-skid portion 171 includes a plurality of first protrusions 173, and the second anti-skid portion 172 includes a plurality of second protrusions 174. The plurality of first protrusions 173 and the plurality of second protrusions 174 are formed by protruding from the second substrate 120 toward the first substrate 110. The plurality of first protrusions 173 are continuously arranged to form a first anti-skid portion 171, and the plurality of second protrusions 174 are continuously arranged to form a second anti-skid portion 172. The first protrusions 173 and the second protrusions 174 are each continuously arranged to form an arc shape or a bending-line shape.

In this embodiment, the first protrusions 173 and the second protrusions 174 are all small protrusions arranged continuously. When the second substrate 120 is the array substrate 140, the first protrusions 173 and the second protrusions 174 are continuously arranged small protrusions formed on the passivation layer 141 of the array substrate 140 protruding toward the color filter substrate 130. When the second substrate 120 is the color filter substrate 130, the first protrusions 173 and the second protrusions 174 are continuous small protrusions formed on the black matrix 131 of the color filter substrate 130 protruding toward the array substrate 140.

By the first anti-skid portion 171 composed of the plurality of consecutive first protrusions 173 and the second non-slip portion 172 composed of the plurality of consecutive second protrusions 174, when the display panel 100 is subjected to an external force and the spacer 150 is bent and displaced due to the force, the spacer 150 will be blocked by the plurality of first protrusions 173 or the plurality of second protrusions 174. In the case where the spacer 150 continues to move, the track-like structure formed by the plurality of continuous first protrusions 173 and the plurality of continuous second protrusions 174 causes the spacer 150 to move following the extending direction of the plurality of continuous first protrusions 173 and the plurality of continuous second protrusions 174. Since the extension directions of the plurality of first protrusions 173 and the plurality of second protrusions 174 do not intersect the pixel region 186, when the spacer 150 moves along the track formed by the first protrusion 173 and the second protrusion 174, it will move in a direction away from the pixel region 186, preventing the spacer 150 from scratching the alignment film 160 of the pixel region 186 during the movement, and ensuring the display effect of the display panel 100.

The first protrusion 173 and the second protrusion 174 in this application may be cylindrical protrusions or rectangular parallelepiped protrusions. There is a certain gap between two adjacent first protrusions 173 or two adjacent second protrusions 174, so that a relatively strong friction is produced when the spacer 150 moves between two adjacent first protrusions 173 or two adjacent second protrusions 174 during the movement process. Thus, the displacement speed of the spacer 150 is effectively eased, so that the spacer 150 can stop displacement as soon as possible, further reducing the risk of the spacer 150 sliding to the pixel region 186 and scratching the alignment film 160 of the pixel region 186.

Further, the heights of the plurality of first protrusions 173 gradually decrease in the direction of being close to the spacer 150 to being away from the spacer 150. The heights of the plurality of second protrusions 174 gradually decrease from in the direction of being close to the spacer 150 to being away from the spacer 150.

Since the purpose of providing the anti-skid structure 170 in the present application is not to completely restrict the movement of the spacer 150, but to guide the movement of the spacer 150, which is guided by the track formed by the first anti-skid portion 171 and the second anti-skid portion 172. The spacer 150 moves in a direction away from the pixel region 186 to prevent the spacer 150 from scratching the alignment film 160 of the pixel region 186. Under this premise, the heights of the first protrusions 173 and the second protrusions 174 in this embodiment do not need to be very high, that is, they do not need to completely block the spacer 150. When the spacer 150 is moving, the first protrusion 173 or the second protrusion 174 may partially stand on it. Therefore, the heights of the plurality of first protrusions 173 and the plurality of second protrusions 174 are set to gradually decrease in the direction from being close to the spacer 150 to being away from the spacer 150, so that during the movement of the spacer 150, even if the spacer 150 partially stands on the first protrusions 173 or the second protrusions 174, the spacer 150 will also be guided from a high position to a low position by the plurality of first protrusions 173 or the plurality of second protrusions 174 due to the height difference formed by the continuous plurality of first protrusions 173 and the continuous plurality of second protrusions 174. Further, along the heights of the plurality of first protrusions 173 or the second protrusions 174 are getting lower and lower in the direction of getting farther away from the pixel region 186. Therefore, the spacer 150 can more easily move away from the pixel region 186 along the diagonal direction formed by the plurality of first protrusions 173 or the plurality of second protrusions 174, preventing the spacer 150 from scratching the alignment film 160 of the pixel region 186, ensuring the display effect of the display panel 100 and improving the display quality of the display panel 100.

Figure 3:
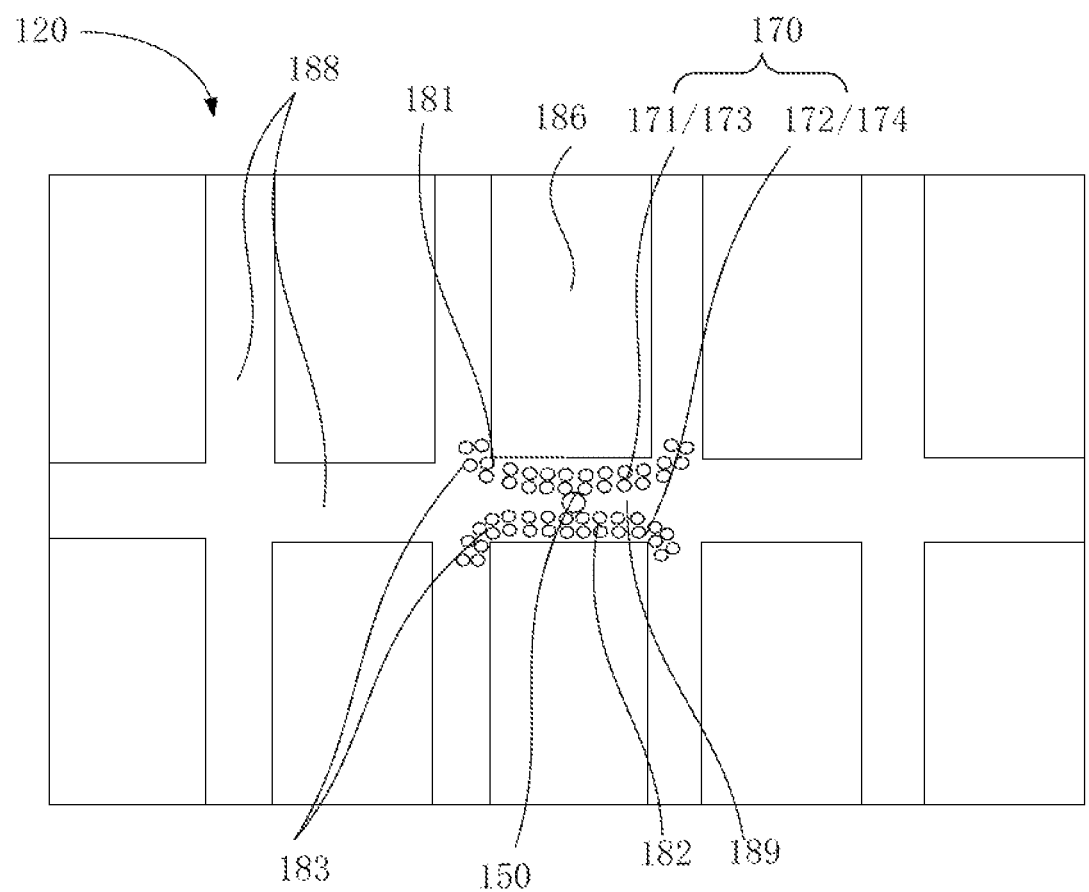
FIG. 3 is a top view of a second substrate of a second embodiment of a display panel according to the present application.

FIG. 3 is a schematic diagram of a second embodiment of a display panel according to the present application. As illustrated in FIG. 3, the embodiment shown in FIG. 3 is a further improvement on the basis of FIG. 2. The plurality of first protrusions 173 are arranged in sequence to form a first blocking wall 181, the first blocking wall 181 has multiple rows, and the multiple rows of first blocking walls 181 are arranged between the spacer 150 and the pixel region 186 at intervals, and the heights of the plurality of first blocking walls 181 gradually increase in the direction from the spacers 150 to the pixel region 186. The plurality, of second protrusions 174 are arranged in sequence to form a second blocking wall 182. There are multiple rows of the second blocking walls 182. The multiple rows of second blocking walls 182 are arranged between the spacer 150 and the pixel region 186 at intervals, and the heights of the plurality of second blocking walls 182 gradually increase in the direction from the spacers 150 to the pixel region 186.

In this embodiment, a plurality of first protrusions 173 are arranged in sequence to form a first blocking wall 181, and a plurality of second protrusions 174 are arranged in sequence to form a second blocking wall 182. The first blocking wall 181 and the second blocking wall 182 are each arranged in multiple rows between the spacer 150 and the two adjacent pixel regions 186. That is to say, the rows of first blocking walls 181 are located between the spacer 150 and one of the adjacent pixel regions 186, and the rows of second blocking walls 182 are located between the spacer 150 and another of the adjacent pixel regions 186. And the height of the first blocking wall 181 or the second blocking wall 182 that is closer to the spacer 150 is lower than the height of the first blocking wall 181 or the second blocking wall 182 that is farther away from the spacer 150. In this way, the plurality of first blocking walls 181 and the plurality of second blocking walls 182 enclose both sides of the spacer 150 into a basin-like structure.

When the spacer 150 is bent and displaced by force, if the pressure is too large and the displacement is too violent, it may rush to the first blocking wall 181 or the second blocking wall 182 adjacent to the spacer 150. While the spacer 150 continues to rush upward, the height of the first blocking wall 181 or the second blocking wall 182 close to the pixel region 186 is higher than that of the first blocking wall 181 or the second blocking wall 182 close to the spacer 150 high, so that the first blocking walls 181 and the second blocking walls 182 surrounding the spacer 150 form a basin-like structure, and the higher first blocking wall 181 or the second blocking wall 182 will first block the spacer 150, thus preventing the spacer 150 from moving towards the pixel region 186. Furthermore, the height difference formed between the plurality of first blocking walls 181 or the plurality of second blocking walls 182 is utilized, so that the spacer 150 is continuously resisted during the upward rushing process, finally slides back to the track formed by the first blocking wall 181 and the second blocking wall 182 from high to low, which further prevents the spacer 150 from sliding toward the pixel region 186, to ensure the stability of the track formed by the first blocking wall 181 and the second blocking wall 182 to move the spacer 150 away from the pixel region 186. Furthermore, the multiple rows of the first blocking walls 181 and the second blocking walls 182 form a basin-type design with a height difference, which also makes it difficult for the spacer 150 to slide out of the first blocking wall 181 or the second blocking wall 182, and makes it easier to move away from the pixel region 186 in the direction of the height difference, which has a better effect on guiding the movement of the spacer 150.

Figure 4:
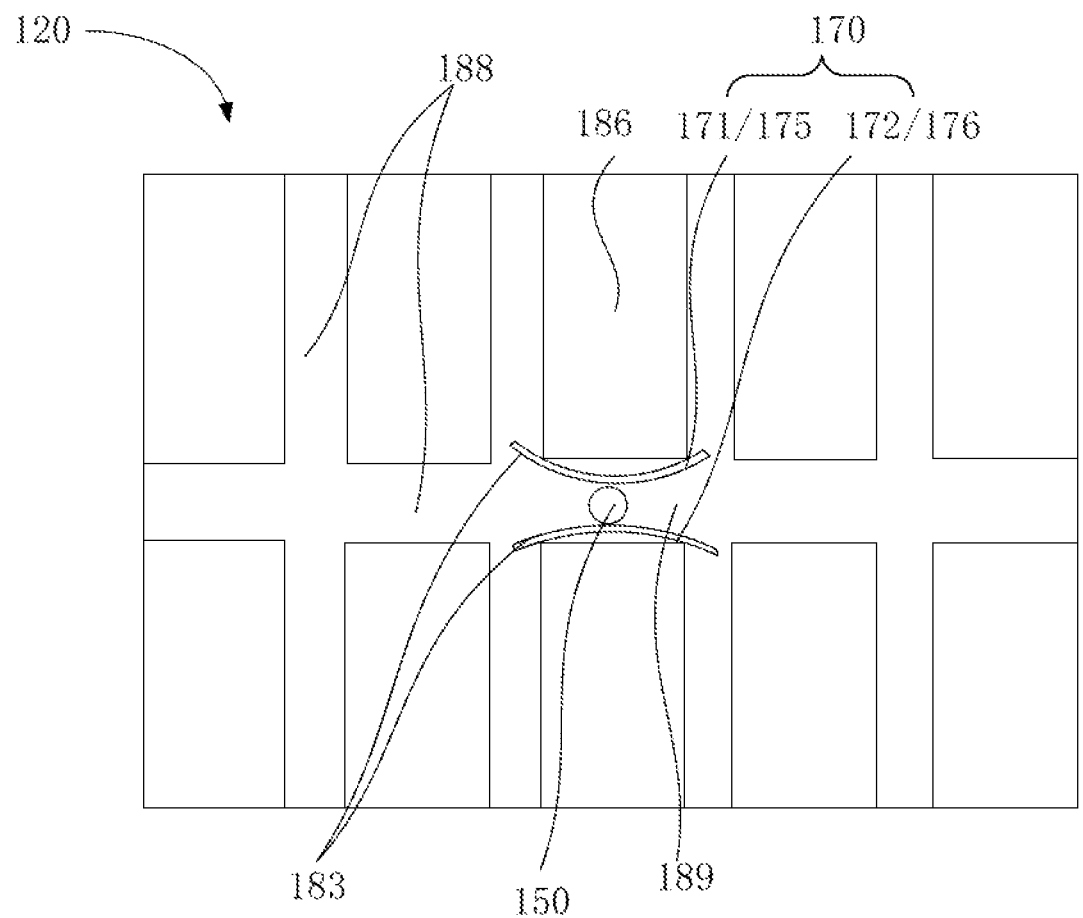
FIG. 4 is a top view of a second substrate of a third embodiment of the display panel according to the present application.
Figure 5:
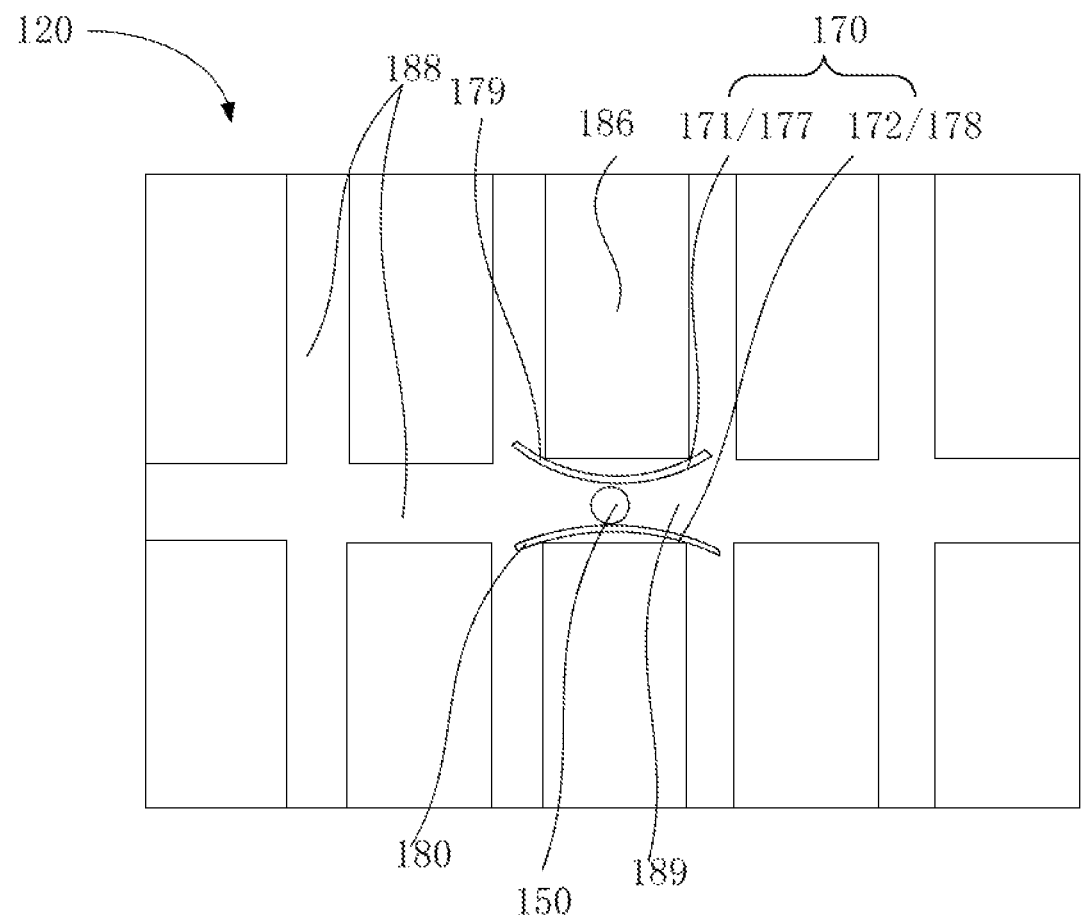
FIG. 5 is a top view of a second substrate of a fourth embodiment of the display panel according to the present application.

FIG. 4 is a schematic diagram of a third embodiment of the display panel of the present application. As illustrated in FIG. 4, the embodiment illustrated in FIG. 5 is an improvement based on FIG. 2, and the first anti-skid portion 171 includes a first raised strip 175. The second anti-skid portion 172 includes a second raised strip 176. The first raised strips 175 and the second raised strips 176 are both elongated protrusions formed by the second substrate 120 protruding toward the first substrate 110. The first raised strip 175 and the second raised strip 176 are arc-shaped or bending-line-shaped.

When the first substrate 110 is the color filter substrate 130 and the second substrate 120 is the array substrate 140, the first raised strip 175 and the second raised strip 176 are formed by protruding from the passivation layer 141 of the array substrate 140 toward the color filter substrate 130, and the extending directions of the elongated protrusions does not intersect the adjacent pixel region 186. Similarly, when the first substrate 110 is the array substrate 140 and the second substrate 120 is the color filter substrate 130, the first raised strips 175 and the second raised strips 176 are elongated protrusions formed by the black matrix 131 of the color filter substrate 130 protruding toward the array substrate 140.

In this embodiment, the first anti-skid portion 171 and the second anti-skid portion 172 are each a whole strip of elongated protrusion, and the shape of the elongated protrusion is an arc shape or a bending-line shape; of course, other shapes are also possible, as long as it is ensured that the extending direction of the elongated protrusions does not intersect the two adjacent pixel regions 186.

When the spacer 150 is bent and displaced under pressure, it will first contact the first raised strip 175 or the second raised strip 176, and be blocked by the first raised strip 175 or the second raised strip 176. When the spacer 150 is further displaced, the spacer 150 will move along the extending direction of the elongated first raised strip 175 or the second raised strip 176, so that the track-like structure formed by the first protrusions 175 and the second protrusions 174 can move the spacer 150 away from the pixel region 186 to prevent the spacer 150 from moving toward the pixel region 186 and scratching the alignment film 160 of the pixel region 186, so that the display, effect of the display panel 100 is guaranteed.

Furthermore, since the first raised strip 175 and the second raised strip 176 are each an entire arc-shaped or bending-line raised strip, when the spacer 150 moves along the first raised strip 175 or the second raised strip 176, it will be smoother, so that the display panel 100 is more naturally deformed to a certain extent under pressure, and the overall stability is better.

FIG. 5 is a schematic diagram of a fourth embodiment of the display panel of the present application. As shown in FIG. 5, the embodiment shown in FIG. 5 is a variant based on FIG. 4. The first anti-skid portion 171 includes a first groove 177, and the second anti-skid portion 172 includes a second groove 178. The first groove 177 and the second groove 178 are each concavely formed in the second substrate 120 which sinks in a direction away from the first substrate 110. The extending directions of the first groove 177 and the second groove 178 are arc-shaped or bending-line-shaped.

When the first substrate 110 is the color filter substrate 130 and the second substrate 120 is the array substrate 140, the first groove 177 and the second groove 178 are both elongated grooves formed concavely in the passivation layer 141 of the array substrate 140 which sinks in the direction away from the color filter substrate 130. When the first substrate 110 is the array substrate 140 and the second substrate 120 is the color filter substrate 130, the first groove 177 and the second groove 178 are both elongated grooves formed concavely in the black matrix 131 of the color filter substrate 130 which sinks in the direction away from the array substrate 140.

When the widths of the first groove 177 and the second groove 178 are greater than the width of the end of the spacer 150 abutting on the second substrate 120, when the spacer 150 is bent and displaced under the action of pressure, the spacer 150 may fall into the first groove 177 or the second groove 178 during movement, so that the spacer 150 can only move in the elongated space formed by the first groove 177 or the second groove 178. That is, both the first groove 177 or the second groove 178 can guide the spacer 150, and the spacer 150 falling into the first groove 177 or the second groove 178 can only move along the extending direction of the first groove 177 or the second groove 178, and the extension directions of the first groove 177 and the second groove 178 do not intersect the two adjacent pixel regions 186. In this way, the spacer 150 can only move along the first groove 177 or the second groove 178 in a direction away from the pixel region 186, which prevents the spacer 150 from moving toward the pixel region 186 and scratching the alignment film of the pixel region 186 160, thereby ensuring the display effect of the display panel 100.

When the widths of the first groove 177 and the second groove 178 are smaller than the width of the end of the spacer 150 abutting against the second substrate 120, when the spacer 150 is bent and displaced under pressure, the spacer 150 may partially fall into the first groove 177 or the second groove 178 during the moving process, so that the spacer 150 is inclined as a whole. Even if the spacer 150 continues to move, it can only move along the extending direction of the first groove 177 or the second groove 178, and the extending directions of the first groove 177 and the second groove 178 do not intersect the two adjacent pixel regions 186, so that the spacer 150 can only move along the first groove 177 or the second groove 178 in a direction away from the pixel region 186, which prevents the spacer 150 from moving toward the pixel region 186 and scratching the alignment film of the pixel region 186 160, thereby ensuring the display effect of the display panel 100. Moreover, since the spacer 150 only partially falls into the first groove 177 or the second groove 178, when the force acted on the spacer 150 is gone, the spacer 150 can more easily spring back to its original state.

Further, the first groove 177 includes a first groove bottom 179, the first groove bottom 179 is inclined relative to the second substrate 120, and the inclination of the first groove bottom 179 gradually increases from being close to the spacer 150 to being away from the spacer 150. The second groove 178 includes a second groove bottom 180, the second groove bottom 180 is inclined relative to the second substrate 120, and the inclination of the second groove bottom 180 gradually decreases from being close to the spacer 150 to being, away from the spacer 150. Moreover, the width of the first groove 177 and the width of the second groove 178 are greater than the width of one end of the spacer 150 abutting against the second substrate 120.

When the spacer 150 is bent and displaced under pressure, especially when it moves in the direction of two adjacent pixel regions 186, it first fills into the first groove 177 or the second groove 178, and the first groove 177 or the second groove 178 first limits the spacer 150, so that the spacer 150 cannot move further in the direction of the pixel region 186, and at this time, one end of the spacer 150 abutting against the second substrate 120 is in contact with the first groove bottom 179 or the second groove bottom 180, and the first groove bottom 179 and the second groove bottom 180 form a inclination due to the height difference, when the spacer 150 continues to move, it will move away from the pixel region 186 along the inclination, so that the inclined first groove bottom 179 and the second groove bottom 180 can guide the spacer 150, making it easier to make the spacer 150 slide away from the pixel region 186, to prevent the spacer 150 from scratching the alignment film 160 of the pixel region 186, thereby improving the display effect of the display panel 100.

Figure 6:
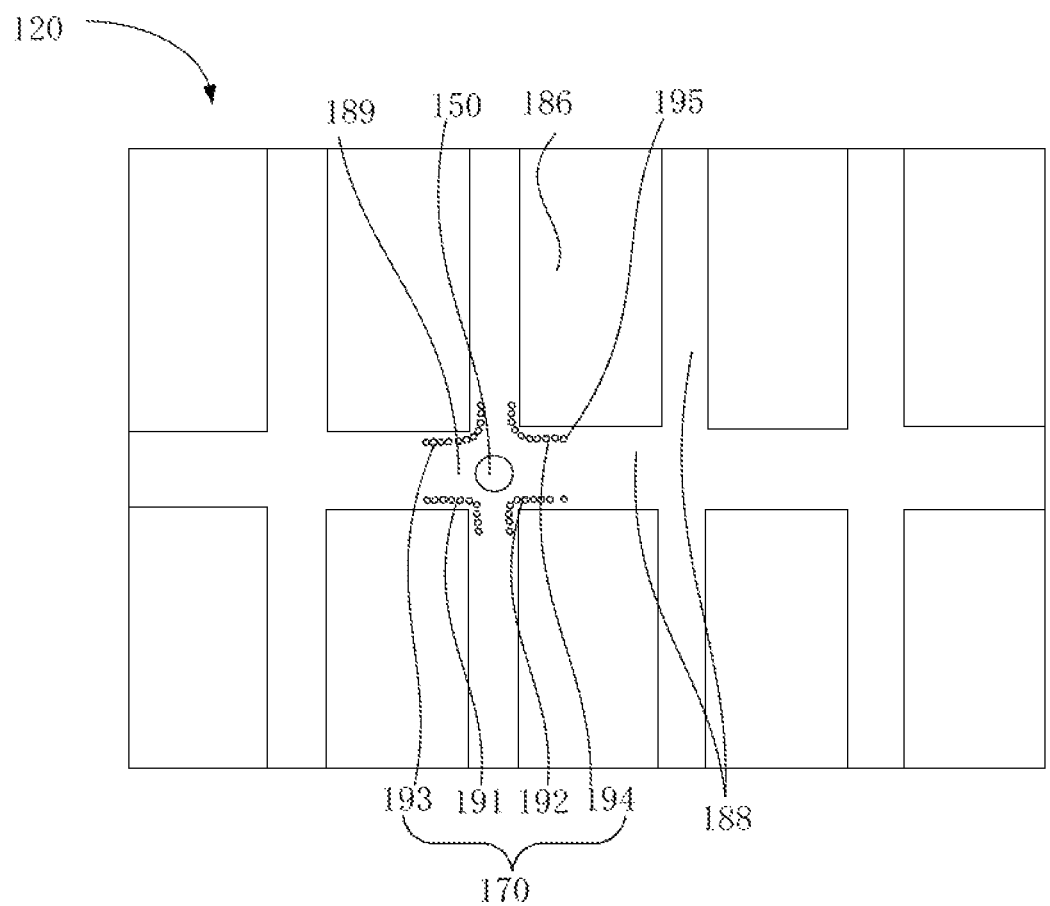
FIG. 6 is a top view of a second substrate of a fifth embodiment of the display panel according to the present application.

FIG. 6 is a top view of a second substrate of a fifth embodiment of the display panel of the present application. As shown in FIG. 6, the anti-skid structure 170 further includes a third anti-skid portion 191, a fourth anti-skid portion 192, a fifth anti-skid portion 193 and a sixth anti-skid portion 194, and the guide member 183 includes a first guide portion 195. One end of the spacer 150 is fixedly connected with the first substrate 110, and the other end is abutted between the four adjacent pixel regions 186. The third anti-skid portion 191, the fourth anti-skid portion 192, the fifth anti-skid portion 193 and the sixth anti-skid portion 194 are respectively disposed between the spacer 150 and the four adjacent pixel regions 186. Both ends of each of the third anti-skid portion 191, the fourth anti-skid portion 192, the fifth anti-skid portion 193 and the sixth anti-skid portion 194 extend along the direction of the shielding region 188 to form a first guide portion 195. The third anti-skid portion 191, the fourth anti-skid portion 192, the fifth anti-skid portion 193, and the sixth anti-skid portion 194 are arranged centrally symmetrically around the spacer 150.

Based on the above-mentioned embodiments, the position of the spacer 150 in the present application is not limited to being disposed between two adjacent pixel regions 186, but can also be disposed at the center position formed by four pixel regions 186.

When the first substrate 110 is the color filter substrate 130 and the second substrate 120 is the array substrate 140, the anti-skid structure 170 can be disposed along the direction of the data line 143 or the direction of the scan line 142.

Figure 7:
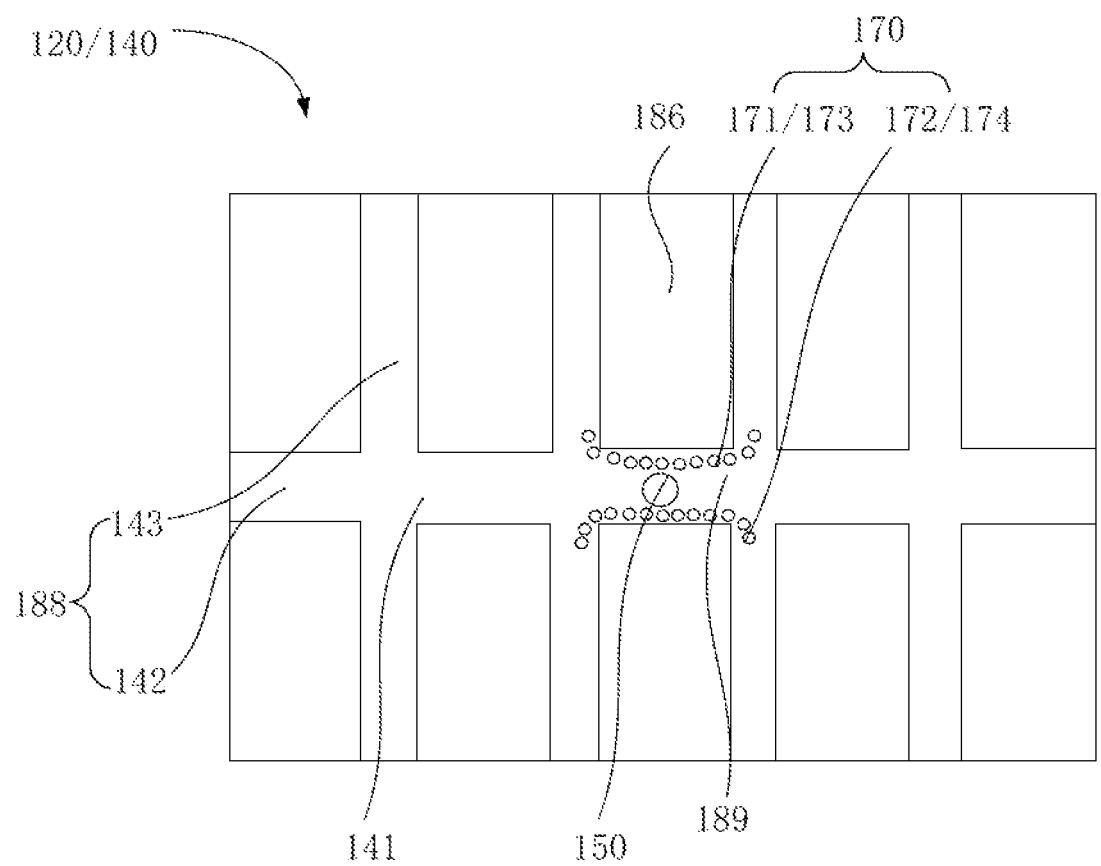
FIG. 7 is a top view of an array substrate of a sixth embodiment of the display panel according to the present application.

FIG. 7 is a schematic diagram of a sixth embodiment of the display panel of the present application. As shown in FIG. 7, the first substrate 110 is a color filter substrate 130, the second substrate 120 is an array substrate 140, and the array substrate 140 is disposed on the side close to the light incident surface of the display panel 100. The array substrate 140 includes a plurality of horizontally arranged scan lines 142, a plurality of vertically arranged data lines 143 and a passivation layer 141. The passivation layer covers the scan lines 142 and the data lines 143. The anti-skid structure 170 is disposed on the passivation layer 141 corresponding to the scan line 142 or the data line 143. The plurality of scan lines 142 and the plurality of data lines 143 cross over each other vertically to divide a plurality of pixel regions 186. The spacer 150 abuts against the shielding region 188 between at least two adjacent pixel regions 186. Both ends of the anti-skid structure 170 extend along the direction of the data line 143 or the scan line 142.

In this embodiment, when the first substrate 110 is a color filter substrate 130, and the second substrate 120 is an array substrate 140, the array substrate 140 is located below the color filter substrate 130 and closer to the side of the backlight module 200. A plurality of horizontal scan lines 142 and a plurality of vertical data lines 143 are arranged on the array substrate 140, and the pixel regions 186 arranged in an array on the array substrate 140 are formed by the plurality of scan lines 142 and the plurality of data lines 143 vertically crossing over each other. One end of the spacer 150 is fixed to the color filter substrate 130, the other end abuts on the passivation layer 141 of the array substrate 140, and is located between two adjacent pixel regions 186. An anti-skid structure 170 is disposed on the passivation layer 141 of the array substrate 140, wherein the first anti-skid portion 171 of the anti-skid structure 170 is located between the spacer 150 and one of the adjacent pixel regions 186, and the second anti-skid portion 172 of the anti-skid structure 170 is located between the spacer 150 and another adjacent pixel region 186. That is to say, the first anti-skid portion 171 or the second anti-skid portion 172 is provided between the spacer 150 and the pixel region 186 to separate them.

When the display panel 100 is subjected to external pressure, the spacer 150 will be bent under the pressure and displaced on the passivation layer 141. In the process of moving, it will first come into contact with the first anti-skid portion 171 or the second anti-skid portion 172 of the anti-skid structure 170, and the spacer 150 is blocked by the first anti-skid portion 171 or the second anti-skid portion 172. At the same time, during the continuous displacement of the spacer 150, the first anti-skid portion 171 and the second anti-skid portion 172 form a track-like structure, so that the spacer 150 moves along the extending direction of the first and second anti-skid portions 171 and 172. Since the extension directions of the first anti-skid portion 171 and the second anti-skid portion 172 do not intersect the data lines 143 and the scan lines 142, that is, the first anti-skid portion 171 and the second anti-skid portion 172 guide the spacer 150 to move, the spacer 150 will not move in the direction of the pixel regions 186 divided by the data lines 143 and the scan lines 142. The spacer 150 moves along the track formed by the first anti-skid portion 171 and the second anti-skid portion 172 in a direction away from the pixel region 186, thus ensuring that even if the spacer 150 moves, the alignment film 160 of the pixel region 186 will not be scratched, which further improves the display effect of the display panel 100 and does not affect the aperture ratio of the display panel 100.

It should be noted that the anti-skid structure 170 in this embodiment includes all the solutions of the anti-skid structure 170 in the above-mentioned embodiments. In order to avoid repeated descriptions, this embodiment only describes the portions different from the above-mentioned embodiments.

Figure 8:
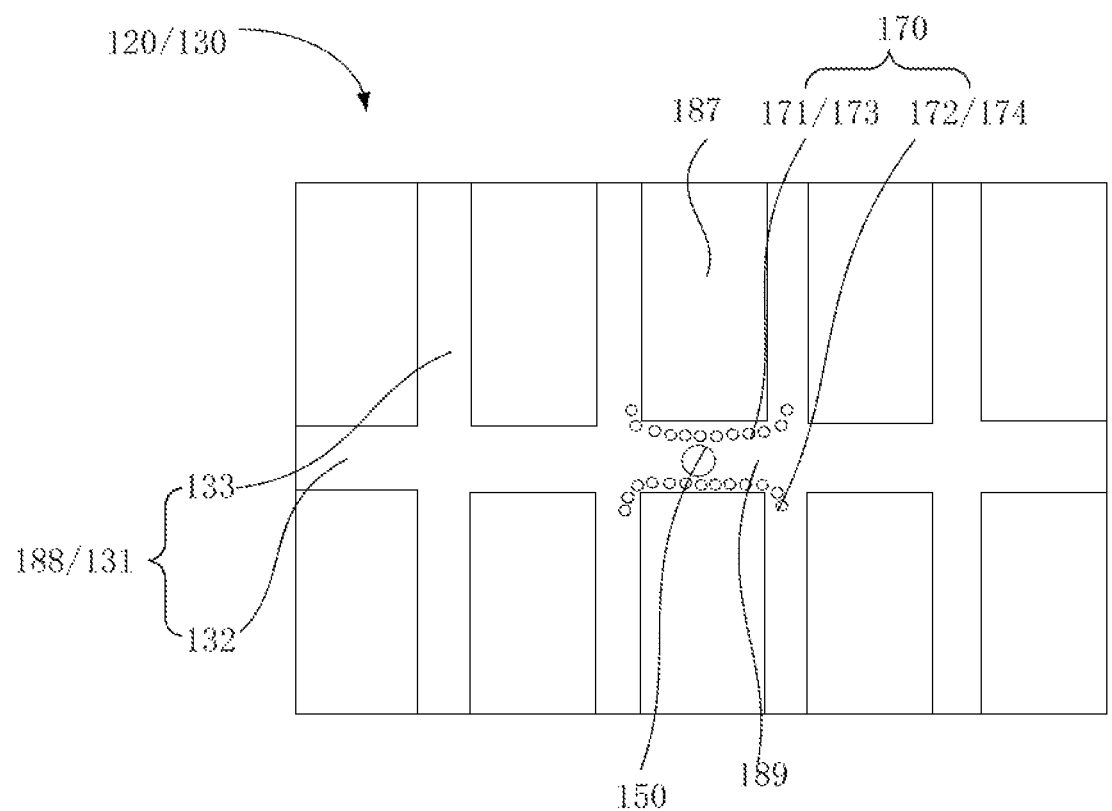
FIG. 8 is a top view of a color filter substrate of a seventh embodiment of a display panel according to the present application.

FIG. 8 is a schematic diagram of a seventh embodiment of the display panel of the present application. As shown in FIG. 8, the first substrate 110 is an array substrate 140, the second substrate 120 is a color filter substrate 130, and the color filter substrate 130 is disposed on the side adjacent to the light incident surface of the display panel 100. The color filter substrate 130 includes a plurality of horizontal black matrices 132 arranged in parallel to each other, and a plurality of vertical black matrices 133 vertically intersecting the horizontal black matrices 132. The plurality of horizontal black matrices 132 intersect the plurality of vertical black matrices 133 to define the plurality of first pixel regions 187 arranged in an array. The horizontal black matrices 132 correspond to the position of the scan lines 142 of the array substrate 140. The vertical black matrices 133 correspond to the position of the data lines 143 of the array substrate 140. One end of the spacer 150 is fixed to the array substrate 140, and the other end is abutted on the horizontal black matrix 132 or the vertical black matrix 133. The anti-skid structure 170 is disposed on the horizontal black matrix 132 or the vertical black matrix 133, and both ends of the anti-skid structure 170 extend along the direction of the horizontal black matrix 132 or the vertical black matrix 133.

The difference between this embodiment and the above-mentioned embodiments is that in this embodiment, the array substrate 140 and the color filter substrate 130 may be inverted, that is, in the display panel 100 of this embodiment, the color filter substrate 130 is located on the side of the light incident surface of the display panel 100, the array substrate 140 is located on the side of the light exit surface of the display panel 100, and the color filter substrate 130 below the array substrate 140 and closer to the backlight module 200.

When the first substrate 110 is the array substrate 140 and the second substrate 120 is the color filter substrate 130, one end of the spacer 150 is fixed to the passivation layer 141 of the array substrate 140, and the other end is abutted on the color filter substrate 130. The color filter substrate 130 is provided with a plurality of horizontally and vertically distributed black matrices 131. The plurality of horizontal black matrices 132 are arranged parallel to each other, and the plurality of horizontal black matrices 132 correspond to the positions of the scan lines 142 of the array substrate 140. The plurality of vertical black matrices 133 are arranged in parallel with each other, and the plurality of vertical black matrices 133 correspond to the positions of the data lines 143 of the array substrate 140. In this way, the plurality of horizontal black matrices 132 and the plurality of vertical black matrices 133 are vertically intersected, so that the color filter substrate 130 is divided into a plurality of first pixel regions 187 arranged in an array, which corresponds exactly to the pixel regions 186 formed by dividing the array substrate 140 by a plurality of data lines 143 and a plurality of scan lines 142. The spacer 150 abuts on the horizontal black matrix 132 or the vertical black matrix 133. Of course, there are usually a plurality of spacers 150 in the display panel 100, and the plurality of spacers 150 are only arranged on the horizontal black matrix 132, of can only be arranged on the vertical black matrix 133. In this way, the display panel 100 can be supported to a certain extent, and at the same time, the material is saved, and the reduction of the number of spacers 150 can also help to improve the display effect of the display panel 100.

In addition, spacers 150 are arranged on both the horizontal black matrix 132 and the vertical black matrix 133, which can better support the color filter substrate 130 and the array substrate 140. When the display panel 100 is subjected to an external force, since the spacers 150 are arranged in both the horizontal and vertical directions to expand the supporting area, the display panel 100 is not easily deformed and collapsed.

The anti-skid structure 170 is arranged on the horizontal black matrix 132 or the vertical black matrix 133. Taking the horizontal black matrix 132 as an example, the first anti-skid portion 171 of the anti-skid structure 170 is located between the spacer 150 and one of the first pixel regions 187 adjacent to the horizontal black matrix 132, and the second anti-skid portion 172 is located between the spacer 150 and another first pixel region 187 adjacent to the horizontal black matrix 132, and the extension directions of the first anti-skid portion 171 and the second anti-skid portion 172 do not intersect the adjacent two first pixel regions 187. That is, a track-like structure formed by the first anti-skid portion 171 and the second anti-skid portion 172 on the horizontal black matrix 132 guides the spacer 150 abutting on the horizontal black matrix 132 to move in a direction away from the partition divided by the black matrix 131. The direction of the first pixel region 187 divided by the black matrix 131. When the display panel 100 is subjected to pressure, the end of the spacer 150 abutting on the horizontal black matrix 132 will move due to bending under force, and the spacer 150 will first encounter the first anti-skid portion 171 or the second anti-skid portion when moving, and is blocked by the first anti-skid portion 171 and the second anti-skid portion 172 so that the spacer 150 cannot move toward the first pixel region 187. At the same time, the track-like structure formed by the first anti-skid portion 171 and the second anti-skid portion 172 will slide the spacer 150 away from the first pixel region 187 to prevent the spacer 150 from scratching the alignment film 160 of the first pixel region 187, thus ensuring the display effect of the display panel 100.

Of course, the spacer 150 can also abut on the vertical black matrix 133. When the spacer 150 abuts on the horizontal black matrix 133, the anti-skid structure 170 is arranged on the vertical black matrix 133 for guiding, the spacer 150 to slide away from the first pixel region 187 to prevent the spacer 150 from scratching the alignment film 160 of the first pixel region 187.

When a plurality of spacers 150 abut on the horizontal black matrix 132 and the vertical black matrix 133 respectively, the anti-skid structure 170 can be provided on both the horizontal black matrix 132 and the vertical black matrix 133, and the above effect can also be achieved, which is not to be detailed herein one by one.

It should be noted that, the anti-skid structure 170 in this embodiment also includes all the solutions of the above-mentioned embodiments. For brevity, this embodiment will only be described with respect to the portions that are different from the above-mentioned embodiments.

It should be noted that the inventive concept of the present application can form a large number of embodiments, but they cannot be enumerated because the length of the application document is limited. The technical features as set forth herein can be arbitrarily combined to form a new embodiment, and the original technical effects may be enhanced after various embodiments or technical features are combined.

The foregoing is a further detailed description of the present application in conjunction with specific optional embodiments, but it should not be construed as that the specific implementation of the present application will be limited to these descriptions. For those having ordinary skill in the technical field of the present application, without departing from the scope and spirit of the present application, some simple deductions or substitutions can be made, which should all be regarded as falling in the scope of protection of the present application.

What is claimed is:

1. A display panel, comprising a first substrate, a second substrate, and a spacer; wherein the first substrate and the second substrate are aligned and bonded together to form a cell, and wherein the spacer is arranged between the first substrate and the second substrate; wherein the second substrate comprises a plurality of pixel regions arranged in an array and a shielding region between adjacent pixel regions; wherein one end of the spacer is fixed onto the first substrate, and another end of the spacer abuts on the respective shielding region; wherein the second substrate further comprises an anti-skid structure that is arranged in the shielding region and that is disposed between the respective adjacent pixel regions; wherein both ends of the anti-skid structure extend along the shielding region to form a guide member; wherein the anti-skid structure comprises a first anti-skid portion and a second anti-skid portion wherein the first anti-skid portion and the second anti-skid portion are each disposed on a respective side of the spacer adjacent to the respective one of the two adjacent pixel regions wherein both ends of each of the first anti-skid portion and the second anti-skid portion extend along the shielding region to form the guide member; wherein the first anti-skid portion comprises a first raised strip and the second anti-skid portion comprises a second raised strip; wherein the first raised strip and the second raised strip are each an elongated protrusion formed by the second substrate protruding toward the first substrate; wherein both the first raised strip and the second raised strip and the second raised strip are each arc-shaped or bending-line-shaped; wherein the first raised strip is curved or bent towards the respective pixel region adjacent to the first raised strip; and wherein two ends of the first raised strip extend beyond two ends of a side of the respective pixel region facing the first raised strip respectively so that the first raised strip is disposed to surround two corners of the respective pixel region and an entirety of the side of the respective pixel region facing the first raised strip; wherein the second raised strip is curved or bent towards the respective pixel region adjacent to the second raised strip and wherein two ends of the second raised strip extend beyond two ends of a side of the respective pixel region facing the second raised strip respectively so that the second raised strip is disposed to surround two corners of the respective pixel region and an entirety of the side of the respective pixel region facing the second raised strip.

2. The display panel of claim 1, wherein an extension direction of the anti-skid structure does not intersect the respective two adjacent pixel regions.

3. The display panel of claim 1, wherein the anti-skid structure comprises a third anti-skid portion, a fourth anti-skid portion, a fifth anti-skid portion, and a sixth anti-skid portion, and wherein the guide member comprises a first guide portion;

wherein one end of the spacer is fixedly connected to the first substrate, and another end of the spacer abuts between four adjacent pixel regions;

wherein the third anti-skid portion, the fourth anti-skid portion, the fifth anti-skid portion, and the sixth anti-skid portion are each arranged between the spacer and the respective one of the four adjacent pixel regions; wherein both ends of each of the third anti-skid portions, the fourth anti-skid portion, the fifth anti-skid portion, and the sixth anti-skid portion extend along the shielding region to form the first guide portion;

and wherein the third anti-skid portion, the fourth anti-skid portion, the fifth anti-skid portion, and the sixth anti-skid portion are centrally symmetrically arranged with the respective spacer as a center.

4. The display panel of claim 1, wherein the first substrate is a color filter substrate, the second substrate is an array substrate, wherein the array substrate is disposed on a side adjacent to a light incident surface of the display panel;

wherein the array substrate comprises a plurality of horizontally arranged scan lines, a plurality of vertically arranged data lines, and a passivation layer, wherein the plurality of scan lines and the plurality of data lines vertically cross over each other to define the plurality of pixel regions; wherein the passivation layer covers on the plurality of scan lines and the plurality of data lines to form the shielding region; wherein the anti-skid structure is formed by the passivation layer and is disposed corresponding to the respective data line or scan line, and the spacer abuts on the shielding region between at least two adjacent pixel regions; wherein both ends of the anti-skid structure extend along the direction of the respective data line or scan line.

5. The display panel of claim 4, wherein the extending direction of each of the first anti-skid portion and the second anti-skid portion does not cross over the respective data line and scan line.

6. The display panel of claim 1, wherein the first substrate is an array substrate, the second substrate is a color filter substrate, and wherein the color filter substrate is disposed on a side adjacent to a light incident surface of the display panel;

wherein the color filter substrate comprises a plurality of horizontal black matrices arranged in parallel with each other, and a plurality of vertical black matrices perpendicularly intersecting the horizontal black matrices; wherein the plurality of horizontal black matrices and the plurality of vertical black matrices form the shielding region, and intersect each other defining a plurality of first pixel regions arranged in an array;

wherein each horizontal black matrix corresponds to a position of the respective scan line of the array substrate;

wherein each vertical black matrix corresponds to a position of the respective data line of the array substrate;

wherein one end of the spacer is fixed onto the array substrate, another end of the spacer abuts on the respective horizontal black matrix or vertical black matrix, and wherein the anti-skid structure is arranged on the respective horizontal black matrix or vertical black matrix, wherein both ends of the anti-skid structure extend in a direction of the horizontal black matrix or the vertical black matrix.

7. The display panel of claim 6, wherein the first anti-skid portion of the anti-skid structure is disposed between the spacer and the respective first pixel region adjacent to the horizontal black matrix, the second anti-skid portion of the anti-skid structure is disposed between the spacer and another respective first pixel region adjacent to the horizontal black matrix, and wherein the extension direction of each of the first anti-skid portion and the second anti-skid portion does not intersect the respective two adjacent first pixel regions.

8. The display panel of claim 7, wherein spacers are arranged on both the horizontal black matrix and the vertical black matrix.

9. A display device, comprising a backlight module and a display panel, the backlight module being arranged on a light incident side of the display panel, the display panel comprising a first substrate, a second substrate, and a spacer; wherein the first substrate and the second substrate are aligned and bonded together to form a cell, and wherein the spacer is arranged between the first substrate and the second substrate; wherein the second substrate comprises a plurality of pixel regions arranged in an array and a shielding region between adjacent pixel regions; wherein one end of the spacer is fixed onto the first substrate, and another end of the spacer abuts on the respective shielding region; wherein the second substrate further comprises an anti-skid structure that is arranged in the shielding region and that is disposed between the respective adjacent pixel regions; wherein both ends of the anti-skid structure extend along the shielding region to form a guide member; wherein the anti-skid structure comprises a first anti-skid portion and a second anti-skid portion wherein the first anti-skid portion and the second anti-skid portion are each disposed on a respective side of the spacer adjacent to the respective one of the two adjacent pixel regions wherein both ends of each of the first anti-skid portion and the second anti-skid portion extend along the shielding region to form the guide member; wherein the first anti-skid portion comprises a first raised strip and the second anti-skid portion comprises a second raised strip; wherein the first raised strip and the second raised strip are each an elongated protrusion formed by the second substrate protruding toward the first substrate; wherein both the first raised strip and the second raised strip and the second raised strip are each arc-shaped or bending-line-shaped; wherein the first raised strip is curved or bent towards the respective pixel region adjacent to the first raised strip; and wherein two ends of the first raised strip extend beyond two ends of a side of the respective pixel region facing the first raised strip respectively so that the first raised strip is disposed to surround two corners of the respective pixel region and an entirety of the side of the respective pixel region facing the first raised strip; wherein the second raised strip is curved or bent towards the respective pixel region adjacent to the second raised strip and wherein two ends of the second raised strip extend beyond two ends of a side of the respective pixel region facing the second raised strip respectively so that the second raised strip is disposed to surround two corners of the respective pixel region and an entirety of the side of the respective pixel region facing the second raised strip.

\* \* \* \* \*